US010394791B2

(12) United States Patent
Honda et al.

(10) Patent No.: US 10,394,791 B2
(45) Date of Patent: Aug. 27, 2019

(54) INFORMATION PROCESSOR DEVICE, INFORMATION PROCESSING SYSTEM, CONTENT IMAGE GENERATING METHOD, AND CONTENT DATA GENERATING METHOD FOR AUTOMATICALLY RECORDING EVENTS BASED UPON EVENT CODES

(71) Applicant: Sony Computer Entertainment Inc., Tokyo (JP)

(72) Inventors: Shinichi Honda, Saitama (JP); Shinichi Kariya, Chiba (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 527 days.

(21) Appl. No.: 14/751,852

(22) Filed: Jun. 26, 2015

(65) Prior Publication Data

US 2016/0026669 A1 Jan. 28, 2016

(30) Foreign Application Priority Data

Jul. 23, 2014 (JP) ................................ 2014-150230

(51) Int. Cl.
*G06F 16/23* (2019.01)
*G06F 16/955* (2019.01)
(Continued)

(52) U.S. Cl.
CPC .............. *G06F 16/23* (2019.01); *A63F 13/30* (2014.09); *A63F 13/40* (2014.09); *A63F 13/79* (2014.09);
(Continued)

(58) Field of Classification Search
CPC ............. G06F 17/30345; G06F 3/0482; G06F 17/30743; G06F 16/23; H04L 67/38;
(Continued)

(56) References Cited

U.S. PATENT DOCUMENTS

| | | | | |
|---|---|---|---|---|
| 8,840,474 B1 * | 9/2014 | Dasan | A63F 13/71 | 463/40 |
| 2007/0072678 A1 * | 3/2007 | Dagres | G07F 17/32 | 463/42 |
| 2008/0268947 A1 * | 10/2008 | Fyock | H04L 67/38 | 463/29 |
| 2009/0019488 A1 * | 1/2009 | Ruiz-Velasco | G06F 3/0482 | 725/43 |
| 2010/0205222 A1 * | 8/2010 | Gajdos | G06F 17/30743 | 707/803 |

(Continued)

FOREIGN PATENT DOCUMENTS

| | | |
|---|---|---|
| JP | 2013-28415 A | 10/2013 |
| JP | 2013-218415 A | 10/2013 |

(Continued)

OTHER PUBLICATIONS

Japanese Office Action dated Mar. 20, 2018 for the Corresponding Japanese Patent Application No. 2014-150230.

*Primary Examiner* — Etienne P Leroux
(74) *Attorney, Agent, or Firm* — Katten Muchin Rosenman LLP

(57) ABSTRACT

Disclosed herein is an information processor including: a behavioral data acquisition section adapted to acquire behavioral data about behaviors performed by a user of interest including dates and times of the behaviors; a feature quantity calculation section adapted to calculate feature quantities indicating features of the behaviors performed by the user of interest at least during each of first and second periods which are different from each other by using the acquired behavioral data; and an evaluation section adapted to evaluate similarity between the user of interest and other users by using at least some of the calculated feature quantities.

12 Claims, 3 Drawing Sheets

(51) Int. Cl.
*A63F 13/30* (2014.01)
*A63F 13/795* (2014.01)
*A63F 13/79* (2014.01)
*A63F 13/40* (2014.01)

(52) U.S. Cl.
CPC .......... *A63F 13/795* (2014.09); *G06F 16/955* (2019.01); *A63F 2300/5566* (2013.01)

(58) Field of Classification Search
CPC ....... H04L 51/32; H04L 65/403; G06Q 50/01; A63F 13/71
See application file for complete search history.

(56) References Cited

U.S. PATENT DOCUMENTS

2012/0259915 A1* 10/2012 Bhatt ..................... G06Q 50/01 709/204
2013/0212493 A1* 8/2013 Krishnamurthy ..... H04L 65/403 715/753
2014/0006505 A1* 1/2014 Rama Rao .............. H04L 51/32 709/204

FOREIGN PATENT DOCUMENTS

JP 2014-119993 A 6/2014
JP 2014-130536 A 7/2014

* cited by examiner

| USER | NATURE OF BEHAVIOR | | DATE AND TIME OF BEHAVIOR |
|---|---|---|---|
| | GAME | NATURE OF PLAY | |
| USER U1 | GAME G1 | WINS TROPHY #1 | 2014/5/1 9:11 |
| USER U2 | GAME G2 | WINS TROPHY #5 | 2014/5/1 9:12 |
| USER U1 | GAME G1 | WINS TROPHY #3 | 2014/5/1 9:15 |
| ⋮ | ⋮ | ⋮ | ⋮ |

FIG. 4

| EXTRACTION CONDITION | | USER U1 | USER U2 | USER U3 |
|---|---|---|---|---|
| GAME TITLE | TARGET EXTRACTION PERIOD | | | |
| GAME G1 | EVERY MONDAY | 5 | 9 | 4 |
| | EVERY TUESDAY | 7 | 11 | 7 |
| | EVERY WEDNESDAY | 4 | 8 | 6 |
| | EVERY THURSDAY | 3 | 9 | 10 |
| | EVERY FRIDAY | 5 | 12 | 8 |
| | EVERY SATURDAY | 1 | 3 | 7 |
| | EVERY SUNDAY | 0 | 4 | 12 |
| GAME G2 | EVERY MONDAY | 0 | 1 | 5 |
| | EVERY TUESDAY | 0 | 2 | 3 |
| | EVERY WEDNESDAY | 2 | 0 | 4 |
| | EVERY THURSDAY | 0 | 1 | 7 |
| | EVERY FRIDAY | 1 | 3 | 4 |
| | EVERY SATURDAY | 12 | 8 | 10 |
| | EVERY SUNDAY | 9 | 13 | 9 |

INFORMATION PROCESSOR DEVICE, INFORMATION PROCESSING SYSTEM, CONTENT IMAGE GENERATING METHOD, AND CONTENT DATA GENERATING METHOD FOR AUTOMATICALLY RECORDING EVENTS BASED UPON EVENT CODES

BACKGROUND

The present disclosure relates to an information processor, an information processing method, and a program for evaluating similarity between a plurality of users, and to an information storage medium storing the program.

In a service adapted to provide a plurality of pieces of content to a plurality of users, for example, there is a case in which similar users are found who assumably have a similar preference to those of a user of interest so as to recommend content used by these similar users. Thus, by evaluating similarity between users on the basis of a determination criterion of some kind, it is possible to use the evaluation result for a variety of applications including recommending content and analyzing users' behaviors. Determining users who purchased similar pieces of content to be similar (so called collaborative filtering) is, for example, a method of evaluating similarity between users.

SUMMARY

In general, users' preferences and behaviors change with time. More specifically, their preferences may change over a long span of time, and their behavioral patterns may change depending on the days of the week, the time zone of the day, and so on. In related art, enough consideration has not been given to such changes with time in evaluating similarity between users.

The present disclosure has been devised in light of the foregoing, and it is desirable to provide an information processor, an information processing method, and a program for evaluating similarity between a plurality of users, and to an information storage medium storing the program.

An information processor according to an embodiment of the present disclosure includes a behavioral data acquisition section, a feature quantity calculation section, and an evaluation section. The behavioral data acquisition section acquires behavioral data about behaviors performed by a user of interest including dates and times of the behaviors. The feature quantity calculation section calculates feature quantities indicating features of the behaviors performed by the user of interest at least during each of first and second periods which are different from each other by using the acquired behavioral data. The evaluation section evaluates similarity between the user of interest and other users by using at least some of the calculated feature quantities.

Further, an information processing method according to another embodiment of the present disclosure includes acquiring behavioral data about behaviors performed by a user of interest including dates and times of the behaviors. The information processing method further includes calculating feature quantities indicating features of the behaviors performed by the user of interest at least during each of first and second periods which are different from each other by using the acquired behavioral data. The information processing method still further includes evaluating similarity between the user of interest and other users by using at least some of the calculated feature quantities.

Still further, a program according to another embodiment of the present disclosure causes a computer to perform acquiring behavioral data about behaviors performed by a user of interest including dates and times of the behaviors. The program further causes the computer to perform calculating feature quantities indicating features of the behaviors performed by the user of interest at least during each of first and second periods which are different from each other by using the acquired behavioral data. The program further causes the computer to perform evaluating similarity between the user of interest and other users by using the calculated feature quantities. The program may be stored in a computer-readable information storage medium.

BRIEF DESCRIPTION OF THE DRAWINGS

FIG. 4 is a diagram illustrating an example of a user profile.

DETAILED DESCRIPTION OF THE PREFERRED EMBODIMENT

A detailed description will be given below of an embodiment of the present disclosure with reference to the accompanying drawings.

Figure 1:
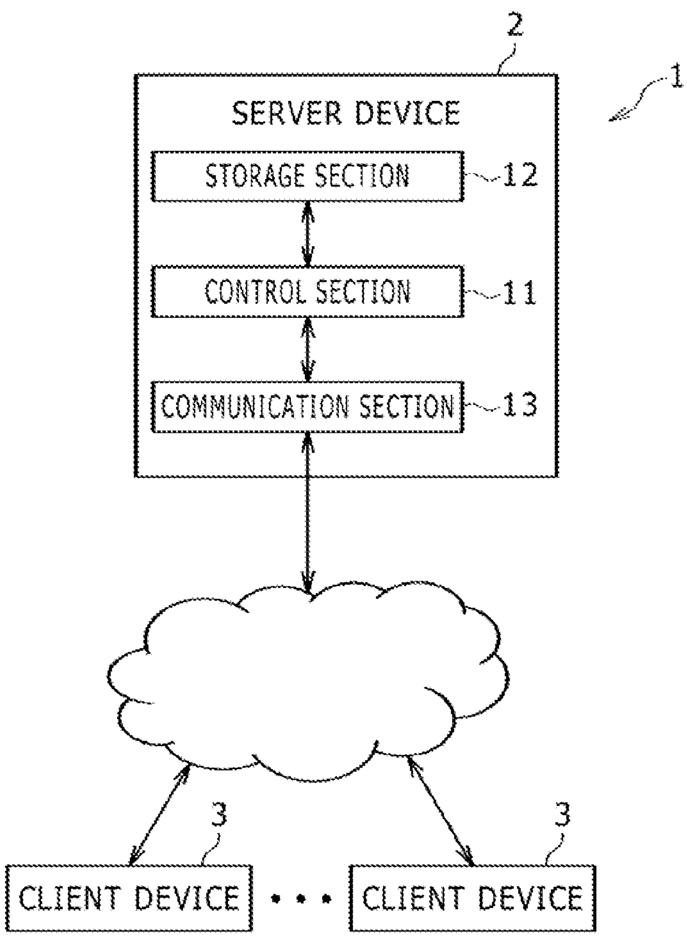
FIG. 1 is an overall configuration diagram of an information processing system according to an embodiment of the present disclosure.

FIG. 1 is an overall configuration diagram of an information processing system 1 including a server device (information processor) 2 according to an embodiment of the present disclosure. As illustrated in FIG. 1, the information processing system 1 includes the server device 2 and a plurality of client devices 3. In the present embodiment, the server device 2 acquires, from each of the plurality of client devices 3, data about behaviors (behavioral data) of users who use that client device 3, evaluating similarity between the plurality of users using the acquired data. Then, the server device 2 recommends content to each user using the evaluation result. Here, we assume, as a specific example, that recommended content is a game title, and that behavioral data of each user indicates games played by that user. Alternatively, the server device 2 may recommend, to each user, not only content but also other user (e.g., user against whom or in collaboration with whom to play) or a time zone adequate for playing a game. Still alternatively, the server device 2 may present a reason for recommendation when content, a user, a time zone, and so on, is recommended.

The server device 2 is an information processor such as server computer and includes a control section 11, a storage section 12, and a communication section 13 as illustrated in FIG. 1.

The control section 11 is, for example, a central processing unit (CPU) and performs a variety of information processing tasks in accordance with a program stored in the storage section 12. The storage section 12 includes a memory element such as random access memory (RAM) and stores a program executed by the control section 11 and data to be processed by the program. The communication section 13 is a communication interface such as local area network (LAN) card. The server device 2 communicates data with each of the client devices 3 via the communication section 13.

Each of the client devices 3 is a terminal device used by a user of the present information processing system 1 and may be, for example, a home game console, a portable game console, a smartphone, a personal computer, and so on. In the present embodiment, each user has his or her own client device 3 and plays a game using the client device 3.

Figures 2, 3:
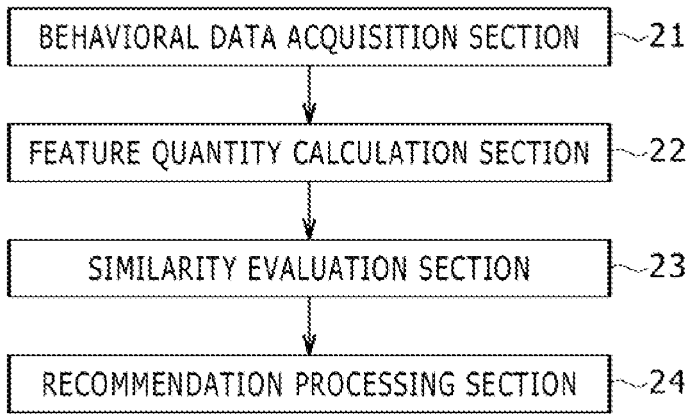
FIG. 2 is a functional block diagram of a client device according to the embodiment of the present disclosure.
FIG. 3 is a diagram illustrating an example of nature of behavioral data.

A description will be given below of the functions implemented by the server device 2 in the present embodiment. As illustrated in FIG. 2, the server device 2 functionally includes a behavioral data acquisition section 21, a feature quantity calculation section 22, a similarity evaluation section 23, and a recommendation processing section 24. These functions are achieved by the control section 11 executing the program stored in the storage section 12. This program may be supplied to the server device 2 via a communication network such as the Internet. Alternatively, the program may be supplied stored in one of a variety of computer-readable information storage media such as optical disc.

The behavioral data acquisition section 21 acquires behavioral data from each of the client devices 3. Behavioral data is data about behaviors performed by each user using the client device 3 and includes nature-of-behavior data and date-and-time-of-behavior data. Nature-of-behavior data indicates the nature of behavior. Date-and-time-of-behavior data indicates the dates and times when the behaviors were performed. As described earlier, nature-of-behavior data indicates the description of game-playing behaviors, and we assume that information identifying game titles is included.

More specifically, nature-of-behavior data may indicate game titles and start and end times of game play when a user plays games with the client device 3. Alternatively, if one of a variety of conditions specified in each game such as clearing a particular stage, acquiring a particular item, or achieving a particular score in the game is met by a user, nature-of-behavior data to that effect may be generated. In particular, some game systems may have a function to manage whether or not a user has achieved each of a plurality of goals set in each game (e.g., trophy function). In this case, each of the client devices 3 may notify the server device 2 of nature-of-behavior data indicating achievement of goals. Further, a difficulty level may be specified for the achievement of each of the goals. For example, a criterion is specified to indicate whether the goal is easy or difficult to achieve, or is intermediate between the two levels. In this case, if a user achieves a preset goal while playing a game, the client device 3 may notify the server device 2 of part of the nature-of-behavior data indicating the difficulty level of the achieved goal.

FIG. 3 is a diagram illustrating an example of nature of behavioral data acquired by the behavioral data acquisition section 21. As illustrated in FIG. 3, behavioral data associates users who performed a behavior, nature of behavior, and date and time of behavior. We assume here that each piece of behavioral data includes a plurality of records each indicating description of one behavior. Further, nature of behavior includes an identifier identifying the content type (game title in this case) and information indicating nature of use of the content (information identifying the trophy acquired in this case). Still further, date-and-time-of-behavior data includes a date and time in FIG. 3. However, date-and-time-of-behavior data is not limited to this format. Instead, a variety of data formats may be used which indicate the time when a behavior of interest was performed. For example, date-and-time-of-behavior data may include information indicating under which one of a plurality of predetermined time zones (e.g., eight three-hour time zones obtained by dividing one day) the time when the behavior was performed falls rather than including detailed time information.

The feature quantity calculation section 22 generates a profile indicating features of a behavior (user profile) for each of the plurality of users by using behavioral data acquired by the behavioral data acquisition section 21. Each user profile includes a plurality of feature quantities. If a profile includes N feature quantities, the profile corresponds to positional coordinates of an N dimensional feature space. Each feature quantity making up a profile is a numerical value included in the behavioral data acquired by the behavioral data acquisition section 21. This numerical value is calculated on the basis of behavioral data that meets a given extraction condition. If N feature quantities make up a profile, N extraction conditions associated therewith are defined in advance. When calculating the ith feature quantity of a user, the feature quantity calculation section 22 extracts, from the behavioral data of that user, the record that meets the ith extraction condition. Then, the feature quantity calculation section 22 calculates the ith feature quantity on the basis of the number of extracted records and/or the nature of behavior included in the extracted records. Repeating such a process allows for the feature quantity calculation section 22 to calculate N feature quantities for each of the plurality of users to be processed.

In the present embodiment in particular, a feature quantity is calculated using an extraction condition that focuses on the date and time when the behavior is performed. More specifically, at least one of the N extraction conditions includes, as a condition, the extraction of a behavior whose date and time are included in a first target period. Another one of the N extraction conditions includes, as a condition, the extraction of a behavior whose date and time are included in a second target period. We assume here that the first and second target periods are different periods. By calculating feature quantities in accordance with behavioral data included in different periods, it is possible to generate profiles that reflect changes of users' preferences over time and behavioral cycles.

Here, the first and second target extraction periods may be identical or different in length. Alternatively, the first and second target extraction periods may not overlap each other or may partially overlap each other. Still alternatively, each of the extraction periods may be periodically repeated. As an example of a periodical extraction period, each of the target extraction periods may be a particular time zone of every day (e.g., from 9 to 12 am every day), a period at weekly intervals such as every Monday, or a period at yearly intervals such as a particular month or week in a year.

Further, some of the N extraction conditions may have the same target extraction period in combination with a condition other than a period. As a specific example, the ith extraction condition may be a condition for extracting a first type of behavior of a plurality of behaviors whose dates and times are included in an extraction period, and the (i+1)th extraction condition may be a condition for extracting a second type of behavior, a behavior different from the first type of behavior, of the plurality of behaviors whose dates and times are included in the same extraction period as for the ith extraction condition. Further, the feature quantity calculation section 22 may calculate feature quantities using extraction conditions for extracting behavioral data from a variety of viewpoints in addition to the period. In particular, the feature quantity calculation section 22 may use a content type (game title) as an extraction condition. In this case, a feature quantity is calculated on a game-title-by-game-title basis. Further, if nature-of-behavior data indicates the achievement of goals set in advance for each game title, and if a difficulty level is specified for each of the goals, the feature quantity calculation section 22 may use, as part of extraction conditions, a condition as to the goal of which difficulty level has been achieved. A description will be given later of examples of extraction conditions for calculating feature quantities.

A feature quantity calculation method will be described below. For example, the feature quantity calculation section 22 may simply use, as a feature quantity, the number of records that meet an extraction condition (i.e., the number of times a behavior that meets the extraction condition has been performed). Further, if behavioral nature is converted into numerical values, the feature quantity calculation section 22 may add up or average the numerical values of behaviors that meet the extraction condition for use as a feature quantity. An example of conversion of behavioral nature into numerical values is representation of behavioral nature with a numerical value such as game score. Further, if behavioral nature included in behavioral data indicates the beginning and end of a particular behavior, the feature quantity calculation section 22 may combine these pieces of behavioral data to calculate the amount of time for which the particular behavior was performed (e.g., the amount of time for which the game was played) and may use it as feature quantities.

FIG. 4 is a diagram illustrating an example of a user profile made up of feature quantities calculated by the feature quantity calculation section 22. In this example, a day of the week, i.e., a periodic target extraction period, and a content type, are used as extraction conditions. That is, a combination of one of seven target extraction periods, namely, Monday through Sunday, and one of two game titles, is used as an extraction condition. Fourteen (14) feature quantities are calculated for each user. Each feature quantity indicates the number of records of behavioral data obtained as a result of the user playing a game with a target title during a target extraction period. In the example shown in FIG. 4, user U1 plays game G1 mainly on weekdays and game G2 on weekends (Saturdays and Sundays), and user U2 shows a similar tendency. On the other hand, user U3 plays both games on weekends. As described above, by calculating feature quantities using extraction conditions that include periods, it is possible to find out that there are differences between users in the manner they play the same games.

The similarity evaluation section 23 performs a similarity evaluation process adapted to evaluate similarity between users on the basis of feature quantities calculated for each of the plurality of users by the feature quantity calculation section 22. A known method may be used to evaluate similarity between users by comparing profiles that include a plurality of feature quantities. More specifically, the similarity evaluation section 23 may calculate the degree of similarity between two users, for example, by calculating the Euclidean distance between the profiles. Alternatively, the similarity evaluation section 23 may calculate the degree of similarity on the basis of one of a variety of criteria such as Pearson's correlation, Jaccard index, and Manhattan distance. In any case, by calculating a numerical value for the degree of similarity indicating the extent to which the profiles of arbitrary two users are similar to each other, it is possible for the similarity evaluation section 23 to evaluate similarity between the users.

It should be noted that the similarity evaluation section 23 may not typically use all the feature quantities calculated by the feature quantity calculation section 22 to evaluate similarity between users. Rather, similar users can be found with fewer calculations by evaluating similarity using some of the feature quantities calculated by the feature quantity calculation section 22 such as those noticeably indicating features of a user of interest. Further, in some cases, each feature quantity may be weighted before calculating the degree of similarity so that users whose feature quantities of interest are close to each other can be preferentially found.

The recommendation processing section 24 selects, in response to a request from the client device 3, a piece of content (game title in the present embodiment) recommended to the user of the requesting client device 3 and transmits information about the selected piece of content to the requesting client device 3. In the present embodiment in particular, if the server device 2 receives a content recommendation request from the client device 3, the recommendation processing section 24 identifies users similar to the user of the requesting client device 3 (user of interest) using the evaluation result of the similarity evaluation section 23. This similar user may be, for example, a user whose degree of similarity with the user of interest is equal to or greater than a given value. Alternatively, this similar user may be a user who is determined, on the basis of a predetermined determination criterion related to degree of similarity, to belong to the same group as the user of interest. A description will be given later of a method of classifying a plurality of users into groups using degree of similarity as described above. When a similar user is identified, the recommendation processing section 24 transmits, to the client device 3, information about the recommended piece of content selected on the basis of a given criterion such as one owned by a given ratio or more of similar users but not owned by the user of interest. As a result, the server device 2 can recommend games played by similar users to the user of interest.

In the description given above, the similarity evaluation section 23 performs a similarity evaluation process in advance and stores the evaluation result thereof in the storage section 12, and the recommendation processing section 24 selects a piece of recommended content using the evaluation result when a content recommendation request is received. However, the present disclosure is not limited thereto. Instead, the similarity evaluation section 23 may perform a similarity evaluation process after the receipt of a content recommendation request and identify users similar to the user of interest who made the request. Conversely, the recommendation processing section 24 may select a recommended piece of content for each of all users in advance and transmit, to the requesting client device 3, information about the piece of content that has already been selected if a content recommendation request is made.

A description will be given below of several specific examples of extraction conditions used by the feature quantity calculation section 22 to calculate feature quantities.

The feature quantity calculation section 22 may use, as extraction conditions, a plurality of target extraction periods of different lengths which end at the time of calculation of feature quantities so as to grasp long-, medium-, and short-term tendencies of each user. For example, the feature quantity calculation section 22 calculates feature quantities for each of three target extraction periods, namely, the immediate past one month (short term), the immediate past one year (medium term), and the entire period from the beginning of usage by the user to the present (long term). This makes it possible to discover users who have a similar tendency for their preferences to change with time.

A target extraction period may be different from one user to another. The time at which user behaviors become frequent may not typically take place at a fixed cycle such as every other week and may be different from one user to another. For this reason, if users similar to the user of interest are identified, the behavioral cycles of the user of interest are identified first, followed by calculating feature quantities of each user by using target extraction periods appropriate to the identified behavioral cycles. In this case, the feature quantity calculation section 22 can identify when the number of behaviors per unit time is equal to or greater than a given value (peak time) so as to identify the time intervals between peak times as behavioral cycles of that user. Calculating feature quantities using such a method makes it possible to find similar users of even a user whose behavioral cycles are special.

Further, the feature quantity calculation section 22 may extract behavioral data for a specific piece of content (game title) for a target extraction period from the beginning of use of the piece of content by each user until a given condition is satisfied. In this case, the beginning of the target extraction period may be a release date of the game title or a time when behavioral data for that game tile is first obtained by each user. Further, the end of the target extraction period may be determined in accordance with the achievement level in that game title. More specifically, the end of the target extraction period may be a time when the achievement level of the user in the specific piece of content reaches a given value. If a plurality of trophies (goals) are set in each of the game titles, the achievement level can be evaluated in terms of the number of trophies won by each user from among all trophies. As an example, the feature quantity calculation section 22 may calculate, as a target extraction period, the period of time it takes for the user to win 10% of all the trophies or win all the trophies. Further, if a difficulty level is specified for each trophy, the period of time it takes to win a given ratio of the trophies with a specific difficulty level may be used as a target extraction period. Alternatively, the length of the period of time itself it takes for each user to reach a given achievement level may be used as a feature quantity. This makes it possible to discover similar users with similar game playing tendencies such as users who play new games in a concentrated manner for a short period of time or those who play games little by little over a long period of time.

Further, the feature quantity calculation section 22 may use, as a feature quantity, a numerical value representing the achievement level of each game title. Still further, the feature quantity calculation section 22 may use, as a feature quantity, an average achievement level of all the pieces of content owned by each user. Still further, the feature quantity calculation section 22 may use, as a feature quantity, a ratio of pieces of content whose achievement level has reached a given value (e.g., 100%) to all the pieces of content owned by each user.

It should be noted that a ratio of achieved goals to the plurality of goals prepared in advance is used here as a game achievement level. However, the achievement level is not limited thereto and may be information indicating up to which stage the game has been played. Further, if a level is specified for each of the characters such as hero in the game, a numerical value representing such a level may be used as an achievement level. Alternatively, information as to whether or not the game has been advanced to a scene prepared in advance (e.g., ending scene) may be used to determine the achievement level.

Further, the feature quantity calculation section 22 may identify the number of game titles played by each user within a target extraction period for use as a feature quantity. This makes it possible to evaluate similarity between users in accordance with tendencies of users who play a plurality of games or those who concentrate on a specific game in the same time period.

Still further, the feature quantity calculation section 22 may use, as part of extraction conditions, a circumstance-related condition in which the user performs a behavior. An example of circumstances in which the user performs a behavior is which type of the client device 3 is used. In the present embodiment, the user can use any of a variety of kinds of the client devices 3 such as portable and stationary game consoles. By tallying behavioral data for each type of the client devices 3 and calculating feature quantities, it is, for example, possible to determine that users playing the game title in the same time zone are dissimilar if some use portable devices and others use stationary devices.

Still further, if the user uses the portable client device 3, whether or not the user is on the move may be included as one of circumstance-related conditions. If the client device 3 can obtain its own positional information, for example, through global positioning system (GPS), the client device 3 can determine whether or not the user is on the move by detecting the change in this positional information. Then, the client device 3 can transmit, to the server device 2, behavior data that includes information as to whether or not the user is on the move. This makes it possible for the feature quantity calculation section 22 to tally two separate sets of behavioral data, namely, behaviors while on the move and those at a halt, thus allowing to calculate feature quantities.

Further, an occasion for starting a behavior may be considered as a circumstance-related condition. When a user plays an online game, he or she may start playing the game alone. However, he or she may also entice a friend to play the game together or may be enticed to play it with a friend together. For this reason, information indicating such a circumstance may be added to an extraction condition. As a result, feature quantities can be calculated by placing more importance on behavioral data of the user enticing a friend to play a game together than on behavioral data of the user being enticed to play a game together by a friend. It is also more likely that users who often play with a friend are determined similar. Further, the feature quantity calculation section 22 may calculate feature quantities using a circumstance-related extraction condition such as invitation to chat made by or to the user.

A description will be given next of another example of a similarity evaluation process performed by the similarity evaluation section 23.

The similarity evaluation section 23 may find similar users by a method other than the above adapted to calculate the degree of similarity. More specifically, the similarity evaluation section 23 may identify users similar to a user by classifying a plurality of users into groups in accordance with conditions related to feature quantities prepared in advance. In this case, the similarity evaluation section 23 identifies, of the plurality of users subject to determination, those whose numerical values of feature quantities satisfy given conditions as belonging to the same group. This makes it possible, for example, to classify, into the same groups, users who have distinctive playing tendencies in terms of time zones and days of the week such as those who play games infrequently on weekdays and frequently on weekends, and those who play till late at night. In particular, it is probable that users having a common social attribute such as students or workers show similar distinctive tendencies. For this reason, profile features common to users whose social attribute is known are found, and these features are determined as conditions for classification. This makes it possible to assume that users who satisfy the classification conditions belong to the same social attribute (i.e., are similar to each other). If users are classified into groups as described above, the recommendation processing section 24 can recommend content using information about similar users who are assumed by the similarity evaluation section 23 to belong to the same social attribute as the user of interest.

Further, the similarity evaluation section 23 may determine, of all the plurality of feature quantities calculated by the feature quantity calculation section 22, the feature quantity actually used for evaluation of similarity on the basis of the feature quantity calculated for the user of interest subject to determination. As a specific example, if the value of a feature quantity calculated using behavioral data of game play for a specific target extraction period is large in the profile of the user of interest, it is possible to assume that the user of interest often plays games in that time zone. For this reason, the degree of similarity between users is evaluated using the feature quantity calculated for the target extraction period during which the feature quantity of the user of interest is equal to or higher than a given value. Similar users identified by such a similarity evaluation process assumably play games frequently in the same time period as the user of interest. If the recommendation processing section 24 recommends a piece of content owned by similar users, i.e., information obtained as described above, it is possible to recommend, to the user of interest, a game that is often played by those users who play games in the same time period as the user of interest. In particular, if a game is played online with users against each other or in collaboration with each other, it is desirable that users should play in the same time period. Therefore, it is suitable to recommend content using such a process.

Further, if similar users are identified by using feature quantities during a target extraction period identified on the basis of the profile of the user of interest as described above, the recommendation processing section 24 may transmit, to the client device 3, information about this target extraction period as information indicating the reason for recommending content. This makes it possible to present, to the user of interest, grounds for recommendation together with a recommended piece of content. We assume, for example, that similar users are identified by using feature quantities calculated with a particular time zone of the day (a morning time zone in this case) specified as a target extraction period. As a result, a piece of content owned by users who often play games in morning time zones is recommended to the user of interest. At this time, the client device 3 attaches, to the pieces of content, a message saying, for example, "Here is a game played by those who play in a morning time zone." The user of interest can use such information indicating grounds for recommendation to determine whether or not to purchase the recommended piece of content.

Further, a recommended piece of content may be selected in accordance with the time when a content recommendation request is made. For example, if a content recommendation request is made from the client device 3 in a morning time zone, similar users are identified by using feature quantities calculated with that morning time zone specified as a target extraction period. Then, the recommendation processing section 24 recommends a piece of content owned by the similar users. This makes it possible to recommend, to the requesting user, a game played by a number of users at each moment in accordance with the time zone.

Still further, the recommendation processing section 24 may recommend playing hours for a specific game. In this case, the game in question (hereinafter referred to as a "target game") may be a game selected as a piece of content by the recommendation processing section 24 using the method described earlier or a game already owned by the user of interest. In any case, once a target game is identified, the recommendation processing section 24 identifies in which time zone the target game is frequently played using the feature quantities calculated by the feature quantity calculation section 22. The feature quantity calculation section 22 does so by using the target game and each of a plurality of target extraction periods as extraction conditions. Then, the recommendation processing section 24 recommends, to the user of interest, the identified time zone as recommended playing hours. This makes it possible to inform the user of interest in which time zone the game he or she intends to play from now is played frequently. As a result, it is expected that the user of interest will be able to easily find a user with whom to play an online game or communicate with other users about games, if not an online game.

Still further, if the user of interest selects a specific user from a list of a plurality of users (e.g., users registered as friends of the user of interest), the recommendation processing section 24 may identify a game more often played by the selected user or a time zone in which the selected user plays games more often using the feature quantities calculated by the feature quantity calculation section 22 and notify the user of interest. This allows the user of interest to know the game which is appropriate to play with the specific user or the time zone in which it is appropriate to do so.

Still further, the recommendation processing section 24 may recommend, to the user of interest, a similar user himself or herself. In the case of a social network game system, for example, friends are added in friend's list between a plurality of users. The information processing system 1 promotes communication between users by allowing the users in the friends' list to inform each other of the current status of game play. In the present embodiment, if there is a user of interest who is looking for a new candidate for friend, a similar user determined to be similar to the user of interest by the process described above may be recommended as a candidate for friend. This makes it possible to recommend, as a candidate for friend, a user whose game-playing style or game preferences are closer. Further, recommendation of a similar user is not limited to recommending a candidate for friend. A similar user may be recommended if the user of interest is looking for somebody against or in collaboration with whom to play an online game.

Still further, when selecting content to recommend to the user of interest, the recommendation processing section 24 may select a recommended piece of content from among the pieces of content owned by users in the friend's list of the user of interest (friend users) rather than selecting a recommended piece of content from among the pieces of content owned by unspecific users. In this case, the similarity evaluation section 23 evaluates similarity between the user of interest and each of the friend users, sorting the friend users in order of similarity to the user of interest. Then, the similarity evaluation section 23 preferentially recommends the pieces of content owned by the friend user closer to the user of interest. Alternatively, the similarity evaluation section 23 may preferentially recommend the pieces of content in which the achievement levels of the friend users are high or those played by the friend users relatively recently rather than simply recommending the pieces of content owned by friend users.

In the embodiment of the present disclosure described above, similarity between users is evaluated using feature quantities calculated by focusing on time. This makes it possible to find, as similar users, users close to the user of interest in terms of changes with time of behavioral cycles or preferences. Further, behavioral data is acquired which shows how each user uses content, and similarity between users is evaluated on the basis of that behavioral data. This makes it possible to find users who not only simply have a similar preference to content but also show a similar manner of using content.

Further, as will be described below, the information processing system 1 according to the present embodiment makes it highly likely that similar users will be found with higher accuracy than related arts. More specifically, if, for example, similar users are identified through collaborative filtering by using information about which pieces of content were purchased by each user, the data sparseness problem is known. This problem is that other user who happens to purchase a common, special piece of content but actually has a different preference is determined to be similar. In the present embodiment, by extracting behavioral data, accumulated as a result of users using content over a long period of time, from a variety of aspects using a plurality of target extraction periods, it is possible to calculate a number of feature quantities. More specifically, a behavior of the user of interest which consists of winning a trophy at a certain time is used to calculate feature quantities from a plurality of aspects. Such calculation of feature quantities from a plurality of aspects include calculation for Mondays as target extraction periods, calculation for the immediate past one month as a target extraction period, and calculation for a late night time zone. Then, the similarity evaluation section 23 selects, from among the feature quantities calculated by the feature quantity calculation section 22, one which reflects the feature of the user of interest and so on as a feature quantity which will be actually used and identifies similar users using the selected feature quantity as described earlier. This makes it possible to evaluate similarity using a feature quantity of significant nature, thus allowing to avoid the data sparseness problem with ease. Further, the similarity evaluation section 23 may determine a plurality of feature quantity sets, each made up of a plurality of feature quantities selected under various conditions and evaluate similarity using each of the plurality of feature quantity sets to provide improved similarity evaluation accuracy. In this case, N similar user groups are obtained, for example, by evaluating similarity with N sets of feature quantities. Then, the similarity evaluation section 23 may adopt, from among the N similar user group and as a user group similar to the user of interest, a similar user group whose number of similar users belonging to that similar user group falls within a given range. This makes it possible to find similar users having an appropriate data scale.

It should be noted that an embodiment of the present disclosure is not limited to that described above. For example, although recommended content is a game in the above description, the server device 2 may recommend a variety of content such as music, movies, books, and television programs in addition to the games. Further, user behavioral data acquired by the behavioral data acquisition section 21 may be one related, for example, to purchase or use of a variety of content in addition to game-related data. In particular, if content is one which progresses chronologically such as music or a movie, data indicating the beginning or end of content viewing may be used as behavioral data. Further, feature quantities may be calculated on the basis of the progress indicating how far content was viewed rather than a game achievement level. Still further, if content is an electronic book or document data, behavioral data indicating when the user began to read that piece of content or when he or she read it to the last page may be used as behavioral data. Still further, feature quantities may be calculated for use on the basis of the progress indicating up to which page content has been read. Still further, if content is a broadcasting program such as television or radio program, not only viewing of the broadcasting program but also programming of the recording of a broadcasting program may be used as behavioral data. Still further, if a user views or listens to a recorded broadcasting program later, viewing of the program may be used as behavioral data. This makes it possible to evaluate similarity between users, for example, from aspects including how early the user programmed the recording and whether or not the user viewed or listened to the recorded broadcasting program immediately after the broadcasting.

Further, the behavioral data acquisition section 21 may acquire behavioral data related not only to content but also to a variety of behaviors entered by users using or into the client device 3. This makes it possible to analyze so-called life log and medical data using the information processing system according to the present embodiment.

Still further, feature quantities used for a similarity evaluation process are not limited to those related to use of content as described above. For example, the feature quantity calculation section 22 may calculate feature quantities using a variety of data indicating relationships between users in the information processing system 1. More specifically, the feature quantity calculation section 22 may use a feature of a graph indicating linkage between users as friends. Among specific examples of such feature quantities are the number of friends of each user and the number of friends' friends.

Still further, the server device 2 may use the above similarity evaluation process using feature quantities calculated for a plurality of target extraction periods in combination with other known similarity evaluation process. As an example, the server device 2 performs a known similarity evaluation process based only on the title of a purchased piece of content first, thus identifying a plurality of users similar to the user of interest. Then, the server device 2 performs the above similarity evaluation process using feature quantities calculated for a plurality of target extraction periods for the identified similar users, thus calculating similarity between users. Then, the server device 2 preferentially selects the pieces of content, owned by similar users who are determined to be highly similar, as recommended pieces of content. Such a method contributes to reduced processing load as compared to a similarity evaluation process using feature quantities for a plurality of target extraction periods for all users.

Still further, if the recommendation processing section 24 recommends a piece of content to the user of interest once, a user response to the recommendation result may be fed back. In this case, the server device 2 acquires, from the client device 3, information indicating whether or not the recommended piece of content has been purchased by the user of interest. Then, if the user of interest has purchased the recommended piece of content, more importance is attached to the feature quantities used to select that piece of content in the next and future rounds of the similarity evaluation process. This contributes to improved recommendation accuracy for more effective recommendation. Similarly, the recommendation processing section 24 recommends a user or time zone to the user of interest, the user response to the recommendation result may be received as feedback. More specifically, for example, if the recommendation processing section 24 recommends, to the user of interest, a user as somebody against whom to play a game or as a candidate for friend, the server device 2 acquires, as feedback information, whether the user of interest has played a game against the recommended user or has made a friend request. On the other hand, if a time zone is recommended, the server device 2 acquires, as feedback information, whether or not the user of interest actually played a game in the recommended time zone. Then, if feedback information is acquired which shows that the recommendation is effective, the similarity evaluation section 23 need only perform the next and future rounds of the similarity evaluation process with importance attached to the feature quantities that were used to select the recommended target.

The present disclosure contains subject matter related to that disclosed in Japanese Priority Patent Application JP 2014-150230 filed in the Japan Patent Office on Jul. 23, 2014, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processor comprising:

a behavioral data acquisition section adapted to acquire a plurality of behavioral data about behaviors performed by a user of interest including dates and times of the behaviors, wherein each behavioral data includes a behavior, a nature of the behavior, and a timing of the behavior, and wherein each behavioral data is stored in a user profile;

a feature quantity calculation section adapted to calculate feature quantities indicating features of the behaviors performed by the user of interest at least during each of first and second periods which are different from each other by using the timing of the behavior in the acquired plurality of behavioral data;

an evaluation section adapted to evaluate similarity between the user of interest and other users, without using collaborative filtering, by using at least some of the calculated feature quantities; and a recommendation section adapted to concurrently recommend a similar user, determined to be similar to the user of interest, and a video game to play with the similar user by an evaluation result of the evaluation section, to the user of interest, wherein the recommendation section is adapted to recommend (a) a piece of content, owned by a ratio of similar users greater than a threshold ratio, to the user of interest as a recommended piece of content and (b) a timing during which to play the piece of content in collaboration with similar users, wherein the similar users are determined to be similar to the user of interest by an evaluation result of the evaluation section, wherein the piece of content is not owned by the user of interest.

2. The information processor of claim 1, wherein the behaviors relate to a use of content, and the feature quantity calculation section calculates the feature quantities for each type of the content.

3. The information processor of claim 2, wherein the content is a game, and the feature quantity calculation section calculates the feature quantities using an achievement level calculated for the game.

4. The information processor of claim 1, wherein at least one of the first and second periods is periodically repeated.

5. The information processor of claim 1, wherein the first and second periods are different in length.

6. The information processor of claim 1, wherein the feature quantity calculation section calculates feature quantities indicating features of the behaviors performed by the other users for each of the first and second periods, and the evaluation section compares the calculated feature quantities of the user of interest against those of the other users so as to evaluate similarity between the user of interest and the other users.

7. The information processor of claim 1, wherein the feature quantity calculation section calculates feature quantities indicating features of the behaviors performed by the other users at least for a third period which is different from the first period, and the evaluation section compares the feature quantities calculated for the behaviors performed by the user of interest for the first period against those calculated for the behaviors performed by the other users for the third period so as to evaluate similarity between the user of interest and the other users.

8. The information processor of claim 1, wherein the evaluation section evaluates similarity between users by using some of a plurality of feature quantities calculated by the feature quantity calculation section, and the recommendation section presents, to the user of interest, information about periods for the some of the feature quantities as information indicating a reason for the recommendation.

9. The information processor of claim 1, wherein at least one behavioral data from the plurality of behavioral data is data about usage of a video game.

10. The information processor of claim 1, wherein a numerical value is assigned to each of the plurality of behavioral data, and wherein the numerical value is used by the evaluation section adapted to evaluate similarity between the user of interest and the other users.

11. An information processing method comprising:

acquiring a plurality of behavioral data about behaviors performed by a user of interest including dates and times of the behaviors, wherein each behavioral data includes a behavior, a nature of the behavior, and a timing of the behavior, and wherein each behavioral data is stored in a user profile;

calculating feature quantities indicating features of the behaviors performed by the user of interest at least during each of first and second periods which are different from each other by using the timing of the behavior in the acquired plurality of behavioral data;

evaluating similarity, without using collaborative filtering, between the user of interest and other users by using at least some of the calculated feature quantities;

concurrently recommending a similar user, determined to be similar to the user of interest, and a video game to play with the similar user based upon the evaluating, to the user of interest; and recommending (a) a piece of content, owned by a ratio of similar users greater than a threshold ratio, to the user of interest as a recommended piece of content and (b) a timing during which to play the piece of content in collaboration with similar users, wherein the similar users are determined to be similar based upon the evaluating, and wherein the piece of content is not owned by the user of interest.

12. A non-transitory computer-readable information storage medium for storing a program, the program for a computer, including:

acquiring a plurality of behavioral data about behaviors performed by a user of interest including dates and times of the behaviors, wherein each behavioral data includes a behavior, a nature of the behavior, and a timing of the behavior, and wherein each behavioral data is stored in a user profile r;

calculating feature quantities indicating features of the behaviors performed by the user of interest at least during each of first and second periods which are different from each other by using the acquired plurality of behavioral data;

evaluating similarity between the user of interest and other users, without using collaborative filtering, by using the calculated feature quantities;

concurrently recommending a similar user, determined to be similar to the user of interest, and a video game to play with the similar user, based upon the evaluating, to the user of interest; and recommending (a) a piece of content, owned by a ratio of similar users greater than a threshold ratio, to the user of interest as a recommended piece of content and (b) a timing during which to play the piece of content in collaboration with similar users, wherein the similar users are determined to be similar based upon the evaluating, and wherein the piece of content is not owned by the user of interest.

* * * * *